(12) United States Patent
Yoo et al.

(10) Patent No.: US 8,244,187 B2
(45) Date of Patent: Aug. 14, 2012

(54) APPARATUS AND METHOD FOR COMPENSATING INDUCTANCE IN INDUCTIVE COUPLING COMMUNICATIONS

(75) Inventors: Hoi-Jun Yoo, Daejeon (KR); Jerald Yoo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 885 days.

(21) Appl. No.: 12/352,844

(22) Filed: Jan. 13, 2009

(65) Prior Publication Data
US 2009/0215391 A1   Aug. 27, 2009

(30) Foreign Application Priority Data
Feb. 1, 2008   (KR) .................. 10-2008-0010868

(51) Int. Cl.
*H04B 1/38* (2006.01)
(52) U.S. Cl. ......................... 455/73; 455/41.1
(58) Field of Classification Search ............ 455/73, 455/76, 41.1
See application file for complete search history.

(56) References Cited

U.S. PATENT DOCUMENTS

| | | | | |
|---|---|---|---|---|
| 5,450,091 A | * | 9/1995 | Hama | 343/718 |
| 6,307,442 B1 | * | 10/2001 | Meyer et al. | 333/17.1 |
| 6,510,345 B1 | * | 1/2003 | Van Bentem | 607/60 |
| 6,778,022 B1 | * | 8/2004 | Zhang et al. | 331/14 |
| 7,518,458 B2 | * | 4/2009 | Nakamura et al. | 331/167 |
| 2005/0212604 A1 | * | 9/2005 | Cyr et al. | 331/16 |
| 2005/0227627 A1 | * | 10/2005 | Cyr et al. | 455/67.11 |
| 2005/0261797 A1 | * | 11/2005 | Cyr et al. | 700/121 |
| 2006/0030277 A1 | * | 2/2006 | Cyr et al. | 455/77 |
| 2007/0103248 A1 | * | 5/2007 | Nakamura et al. | 331/167 |
| 2008/0194200 A1 | * | 8/2008 | Keen et al. | 455/41.1 |
| 2008/0220733 A1 | * | 9/2008 | McCune | 455/118 |
| 2009/0066448 A1 | * | 3/2009 | Ho et al. | 334/45 |
| 2009/0284318 A1 | * | 11/2009 | Machado | 331/16 |
| 2010/0015917 A1 | * | 1/2010 | Symons et al. | 455/41.1 |
| 2010/0123556 A1 | * | 5/2010 | Rofougaran et al. | 340/10.1 |

FOREIGN PATENT DOCUMENTS

| | | |
|---|---|---|
| JP | 2001-308758 | 11/2001 |
| JP | 2001-344574 | 12/2001 |

OTHER PUBLICATIONS

Office Action from Japanese Patent Office for JP 2009-019697.

* cited by examiner

*Primary Examiner* — Lewis West
(74) *Attorney, Agent, or Firm* — Kane Kessler, P.C.; Barry E. Negrin

(57) ABSTRACT

There is provided an inductive coupling transmitting and receiving apparatus. An inductive coupling transmitting and receiving apparatus according to an embodiment of the present invention comprises an inductive coupling transceiver transmitting and/or receiving data; an inductor connected to the inductive coupling transceiver; and a resonance compensator connected to the inductive coupling transceiver and the inductor to compensate for a change in inductance of the inductor.

14 Claims, 10 Drawing Sheets

APPARATUS AND METHOD FOR COMPENSATING INDUCTANCE IN INDUCTIVE COUPLING COMMUNICATIONS

CROSS-REFERENCE TO RELATED APPLICATION

This application claims priority under 35 U.S.C. §119(a) to a Korean Patent Application No. 10-2008-0010868, filed on Feb. 1, 2008, the entire contents of which are hereby incorporated by reference.

BACKGROUND OF THE INVENTION

1. Field of the Invention

The present invention relates to an inductive coupling transmitting and receiving apparatus.

2. Description of the Related Art

Recently, inductive coupling communications has come into the spotlight as new local area contactless communications. In conventional local area contactless communications such as radio frequency identification (RFID), a frequency band mainly used is a high frequency of 800 MHz to 2.4 GHz, and therefore, power consumption is so high. RFID using a low frequency of 13.56 MHz has a very low data transfer rate of a few tens to a few hundreds of Kbps. On the other hand, in the inductive coupling communications, its data transfer rate is in a very wide range of a few Kbps to a few Gbps, and a data transfer rate of more than a few Mbps can be maintained in despite of its low frequency of about 13.56 MHz.

In such inductive coupling communications, its application area has been expanded to all electronics industries. For example, the inductive coupling communications is applicable to application areas in which an inductor has a fixed inductance, i.e., application areas used in testing chips manufactured using an inductor formed on a chip in large quantities, in communications between chips stacked in a layer structure, in testing circuit boards manufactured/assembled, in data communications, and the like.

In inductive coupling communications, an inductor generally has a fixed inductance. This is because the inductor is solid and stable by being formed in a chip or made of a metal. However, as a conventional art for incorporating an electronic circuit in a flexible material has recently been developed, the inductance of an inductor may not be fixed. For example, the inductor may include an inductor formed in printable electronics, e.g., on a printed circuit board, or an inductor formed of a conductive fabric on cloth. In this case, inductance is varied depending on temporal/spatial changes. Therefore, it is difficult to perform communications having stability and a low error rate.

A conventional phase locked loop (PLL) circuit may be applied to compensate the variation of inductance. However, in the conventional PLL circuit, a waveform outputted from a phase-frequency detector passes through a low pass filter (LPF) and is then converted into a specific digital level by inputting the outputted waveform to an analog-to-digital converter (ADC) via a charge pump. After that, a value of a capacitor bank is adjusted by analyzing the digital level. As such, the conventional PLL circuit uses such a complicated method in which power consumption is very high. This is because the conventional PLL circuit uses "a continuous frequency signal" while its phase and frequency are fixed. For this reason, a precise and stable loop should be formed in the conventional PLL circuit. Therefore, the conventional art uses a complicated device, despite of inefficiency in its power consumption and area occupation.

SUMMARY OF THE INVENTION

The present invention is conceived to solve the aforementioned problems. Accordingly, the present invention provides an apparatus and method for compensating for inductance in inductive coupling communications.

The present invention also provides an apparatus and method for compensating for inductance in inductive coupling communications, which can reduce a time taken to compensate for inductance in the inductive coupling communications, and have small circuit area and low power consumption, required in inductance compensation.

According to an aspect of the present invention, there is provided an inductive coupling transmitting and receiving apparatus, which comprises an inductive coupling transceiver transmitting and/or receiving data; an inductor connected to the inductive coupling transceiver; and a resonance compensator connected to the inductive coupling transceiver and the inductor to compensate for a change in inductance of the inductor.

The resonance compensator may comprise a capacitor bank comprising a plurality of unit capacitors, each of the capacitors being activated or non-activated; a decoder allowing the unit capacitors of the capacitor bank to be activated or non-activated; an oscillator oscillating at a certain frequency based on capacitance of the capacitor bank and inductance of the inductor; a phase-frequency detector comparing the frequency oscillated from the oscillator with a predetermined frequency; and a finite state machine (FSM) controller controlling the decoder based on results detected by the phase-frequency detector.

The resonance compensator may further comprise a power controller controlling any one of the phase-frequency detector, the sense amplifier, the FSM controller, the decoder and the oscillator, or a combination thereof.

According to another aspect of the present invention, there is provided a resonance compensator in an inductive coupling transmitting and receiving apparatus, which comprises a capacitor bank comprising a plurality of unit capacitors, each of the capacitors being activated or non-activated; a decoder allowing the unit capacitors of the capacitor bank to be activated or non-activated; an oscillator oscillating at a certain frequency based on capacitance of the capacitor bank and inductance of the inductor; a phase-frequency detector comparing the frequency oscillated from the oscillator with a predetermined frequency; and an FSM controller controlling the decoder based on results detected by the phase-frequency detector.

The resonance compensator of the inductive coupling transmitting and receiving apparatus may further comprise a power controller controlling any one of the phase-frequency detector, the sense amplifier, the FSM controller, the decoder and the oscillator, or a combination thereof.

According to still another aspect of the present invention, there is provided a method for compensating for inductance in an inductive coupling transmitting and receiving apparatus comprising a variable capacitor, an inductor and a transceiver, which comprises comparing an oscillation frequency of an oscillator connected to the variable capacitor and the inductor with a predetermined reference frequency; and changing capacitance of the variable capacitance based on the frequency comparison result.

In the changing of the capacitance, the capacitance may be increased when the oscillation frequency is higher than the reference frequency; the capacitance may be decreased when the oscillation frequency is lower than the reference frequency; and the capacitance may be maintained when the oscillation frequency is identical to the reference frequency.

When the capacitance is increased, the increased capacitance may be 1.5 times greater than that before the capacitance is increased, and when the capacitance is decreased, the decreased capacitance may be 0.5 times smaller than that before the capacitance is decreased.

According to embodiments of the present invention, when inductance is temporally/spatially changed in inductive coupling communications, communications having stability and a low error rate can be achieved by compensating for the inductance.

Further, in a method of turning on/off a capacitor bank, a sense amplifier and an FSM controller are simply used instead of the conventional complicated method, thereby reducing its power and area.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Hereinafter, exemplary embodiments of the present invention will be described in detail with reference to the accompanying drawings.

<Compensation of Inductance in Inductive Coupling Communications>

The present invention provides an apparatus and method for compensating for inductance in inductive coupling communications, in which a change in inductance of an inductor is detected, and capacitance is changed to compensate for the inductance, so that stable communications can be continuously performed.

An inductive coupling transmitting and receiving apparatus according to an embodiment of the present invention comprises an inductive coupling transceiver transmitting and/or receiving data, an inductor connected to the inductive coupling transceiver, and a resonance compensator compensating for a change in inductance of the inductor. Here, a change in inductance of the inductor is compensated by allowing the change in inductance to offset influence on the inductive coupling transceiver.

Figure 1:
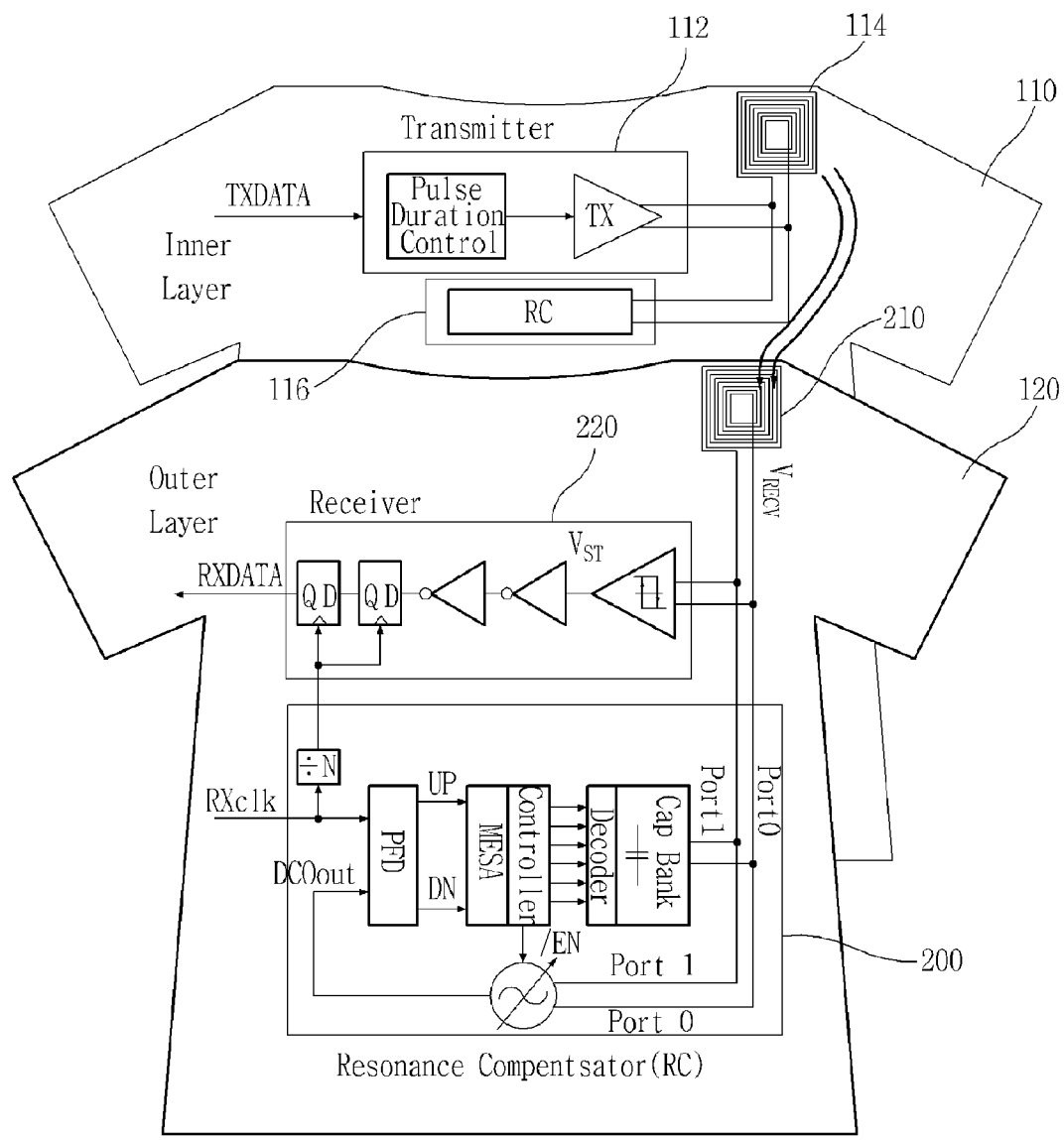
FIG. 1 is a view showing an example of inductive coupling communications in which an inductance compensator is used according to the present invention.

FIG. 1 is a view showing an example of inductive coupling communications in which an inductance compensating apparatus is used according to the present invention. An upper garment comprises, for example, an inner layer 110 and an outer layer 120, which are overlapped with each other. A transmitter 112 and a receiver 220 may be formed in the inner layer 110 and the outer layer 120, respectively. The transmitter 112 and the receiver 220 can be communicated with each other by inductive coupling. For example, a user wears the inner and outer layers 110 and 120 overlapped with each other, and connects an MP3 player to the transmitter 112 of the inner layer 110 and connects an earphone to the receiver 220 of the outer layer 120. Accordingly, the user can listen to music without complicated wiring between the MP3 player and the earphone. For inductive coupling, inductors 114 and 210 are formed in the inner and outer layers 110 and 120, respectively. The inductors 114 and 210 are connected to the transmitter 112 and the receiver 220, respectively.

Here, each of the inductors 114 and 210 respectively formed in the inner and outer layers 110 and 120 has a variable inductance because of its positional property.

Figure 2A:
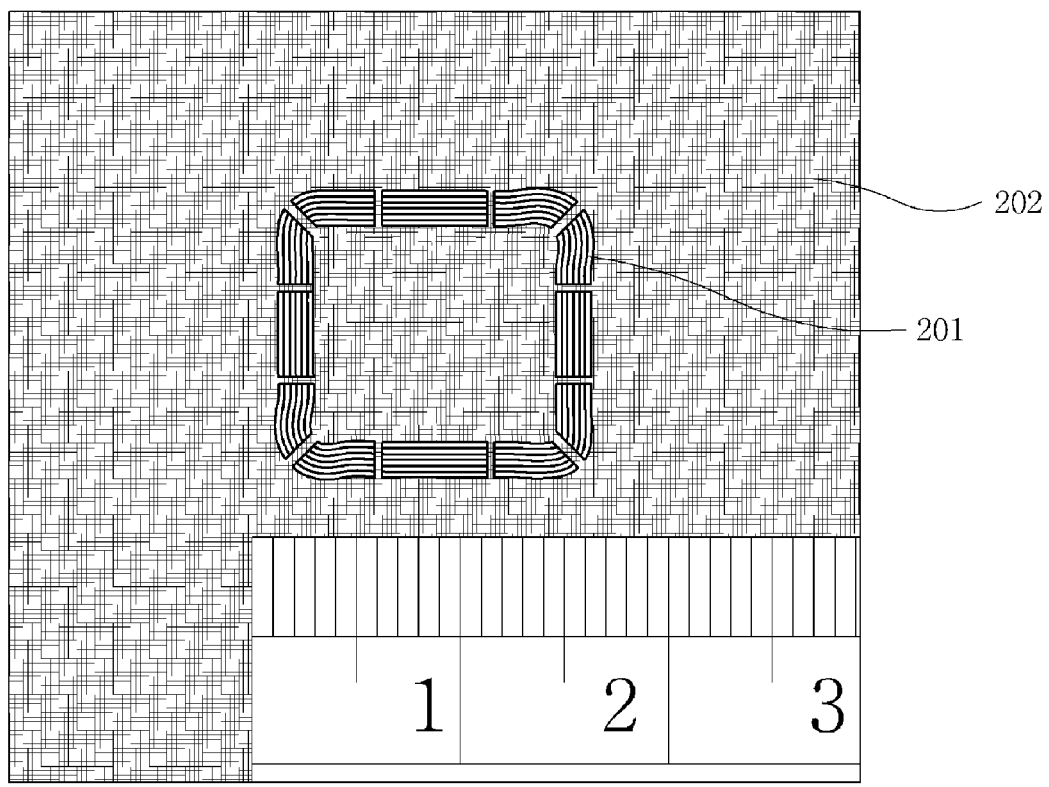
FIG. 2A is a view showing an inductor woven in clothes.
Figure 2B:
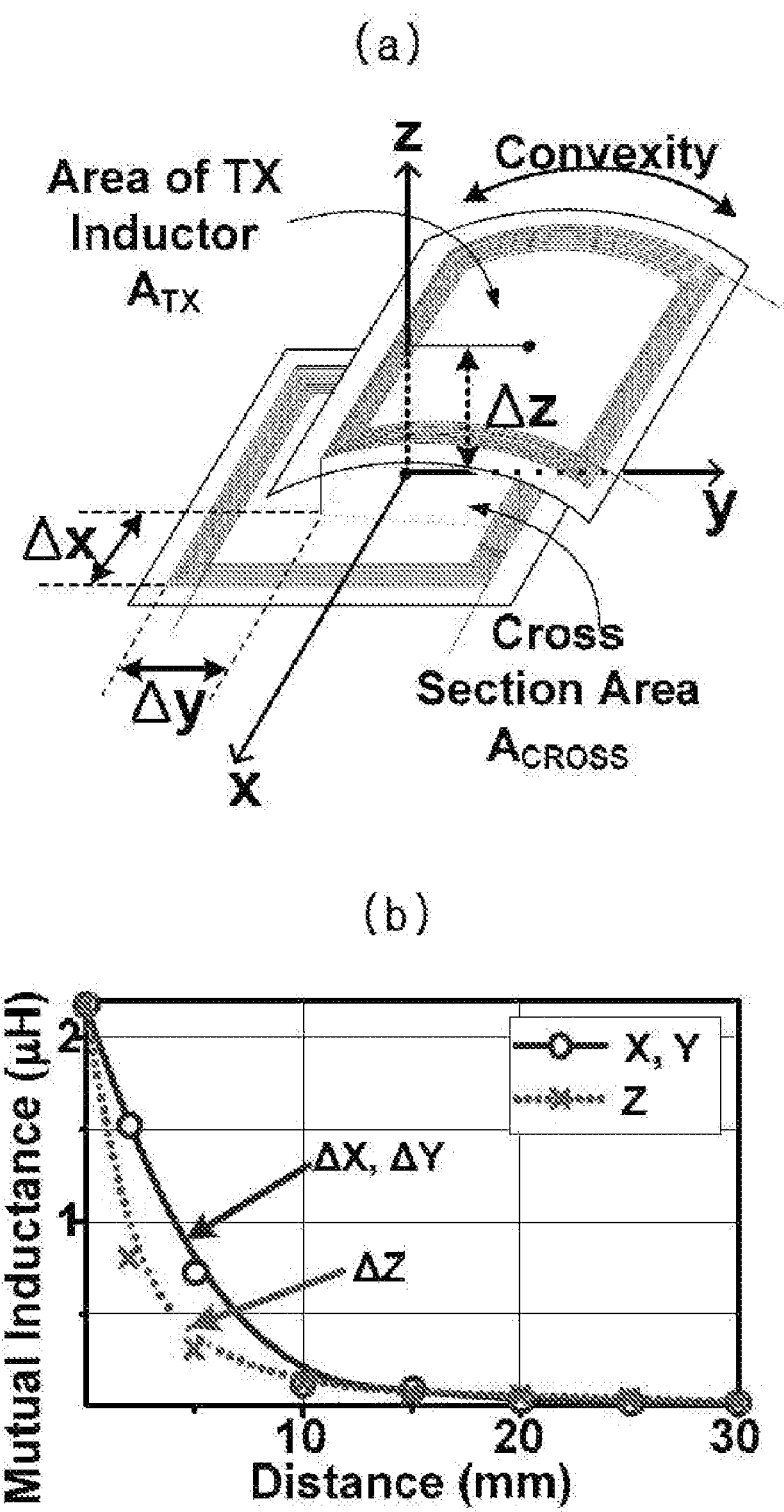
FIG. 2B is a graph showing a change in mutual inductance depending on a relative location, distance or bending between two inductors shown in FIG. 2A.
Figure 2C:
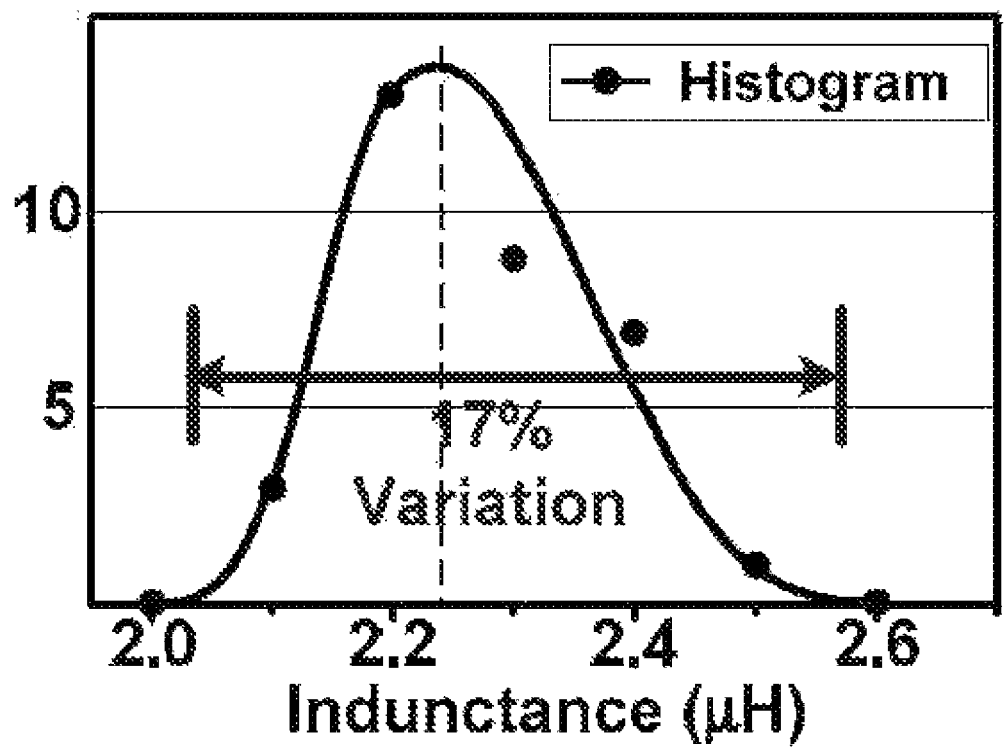
FIG. 2C is a graph showing a variation of inductance due to inequality of inductance of the inductor woven in the clothes.

FIG. 2A is a photograph showing two inductors woven in clothes. FIG. 2B is a view showing parameters that cause a dynamic variation of the inductors shown in FIG. 2A. The inductance of each of the two inductors and the mutual inductance between the two inductors are changed by a relative position ($\Box$x or $\Box$y) between the two inductors, a relative distance ($\Box$z) between the two inductors, and bending of each inductor. FIG. 2C is a graph showing a static deviation of inductors. The static deviation of inductors was obtained by measuring 30 inductors. Inductors may be woven in clothes with conductive thread, and inequality of inductors is caused by an error such as weaving.

As such, each of the inductors 114 and 210 respectively formed in the inner and outer layers 110 and 120 has variable inductance. Therefore, the present invention employs resonance compensators 116 and 200 which can compensate for a change in inductance in inductive coupling communications.

The resonance compensators 116 and 200 according to the present invention achieve the effect that inductance L is fixed in a frequency domain by properly varying capacitance C in accordance with a change in inductance L in L-C resonance.

In order to change capacitance, the resonance compensator 116 and 200 according to the present invention detect only an increase or decrease of a resonance frequency by using a sense amplifier and a finite state machine (FSM) controller instead of using complicated devices such as a charge pump, an ADC, a decoder and the like. Accordingly, it is possible to reduce power necessary for inductance compensation and the area of a chip.

Hereinafter, the resonance compensator 200 according to the present invention will be described in detail. The configuration of the resonance compensator 116 is identical to that of the resonance compensator 200.

<Resonance Compensator 200>

Figure 3:
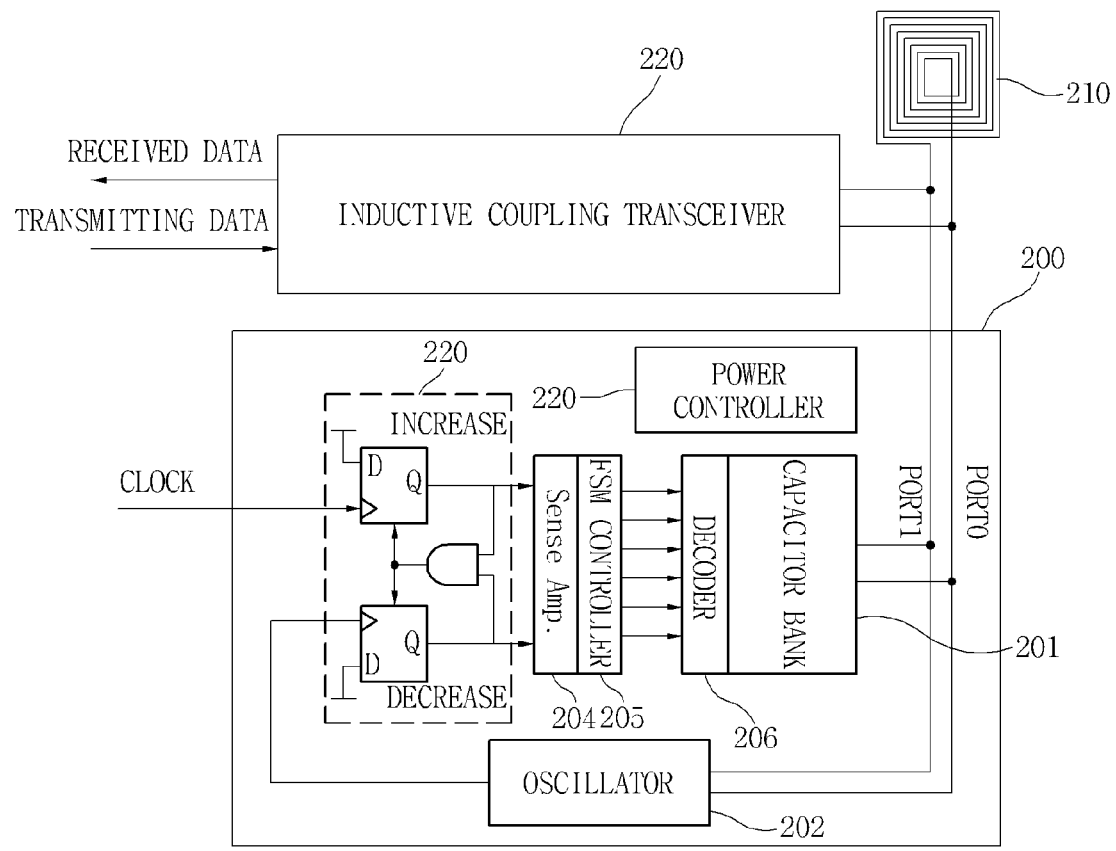
FIG. 3 is a block diagram of a resonance compensator 200 according to an embodiment of the present invention.

FIG. 3 is a block diagram of a resonance compensator 200 according to an embodiment of the present invention.

The resonance compensator 200 is connected to an inductive coupling transceiver 220 and an inductor 210. The inductive coupling transceiver 220 may be the transmitter 112 or receiver 220 of FIG. 1. Alternatively, the inductive coupling transceiver 220 may be a coupling communication means. The inductor 210 has variable inductance, and the inductance has a variation depending on a manufacturing process and an environment.

The resonance compensator 200 comprises a capacitor bank 201, an oscillator 202, a phase-frequency detector 203, a sense amplifier 204, an FSM controller 205, and a decoder 206. The resonance compensator 200 may further comprise a power controller 207.

The capacitor bank 201 comprises a plurality of unit capacitors. Each of the unit capacitors may be activated or non-activated. The capacitance of the capacitor bank 201 is different depending on whether or not each of the unit capacitors is activated. Therefore, the capacitor bank 201 is similar to a variable capacitor.

The decoder 206 allows the unit capacitors of the capacitor bank 201 to be activated or non-activated. The operation of the decoder 206 will be described later.

The oscillator 202 oscillates at a certain frequency based on capacitance of the capacitor bank 201 and inductance of the inductor 210. An effective output frequency $f_{eff}$ of the oscillator 202 is determined by the inductance $L_{eff}$ of the inductor 210 connected to the oscillator 202 and the capacitance $C_{bank}$ of the capacitor bank 201. Here, the effective output frequency $f_{eff}$ is obtained by the following equation.

$$f_{eff} = \frac{1}{2\pi\sqrt{L_{eff}C_{bank}}}$$

The phase-frequency detector 203 compares an oscillation frequency of the oscillator 202 with a predetermined reference clock frequency. When the oscillation frequency of the oscillator 202 is higher than the reference clock frequency, the phase-frequency detector 203 outputs a decrease signal DN through a second output terminal to the sense amplifier 204 so as to lower an oscillation output frequency by increasing the effective capacitance of the capacitor bank 201. On the contrary, when the oscillation frequency of the oscillator 202 is lower than the reference clock frequency, the phase-frequency detector 203 outputs an increase signal UP through a first output terminal to the sense amplifier 204 so as to heighten the oscillation output frequency by decreasing the effective capacitance of the capacitor bank 201. As shown in FIG. 3, an exemplary phase-frequency detector 203 comprises two D flip-flops and one AND logic circuit. The clock signal is inputted into the first D flip-flops and the output of the oscillator 202 is inputted into the second D flip-flops. The output terminal of the first D flip-flops is the first output terminal of the phase-frequency detector 203 and the output terminal of the second D flip-flops is the second output terminal of the phase-frequency detector 203. The first output terminal and the second output terminal are connected to the AND logic circuit. The output of the AND logic circuit is feed into the first and second D flip-flops as their clocks.

Figure 4:
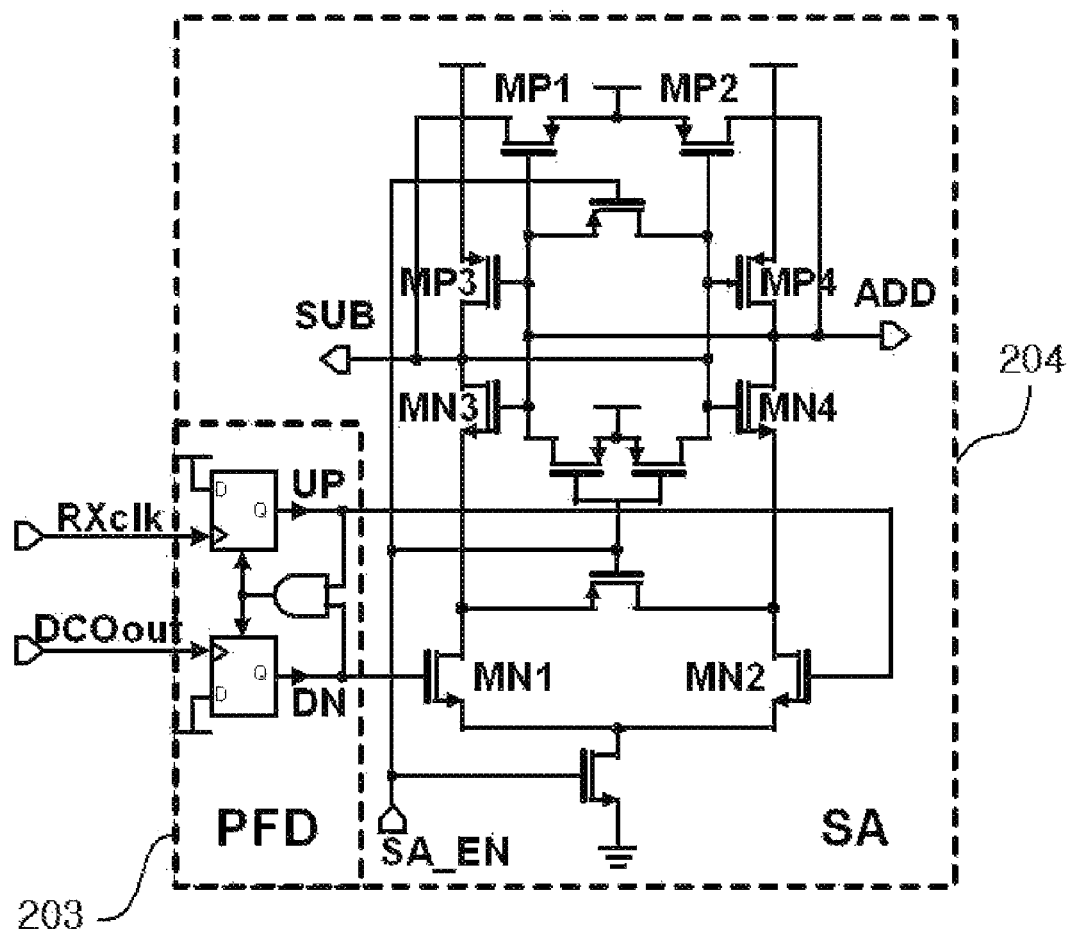
FIG. 4 is a circuit diagram of an exemplary sense amplifier 204.

The sense amplifier 204 receives the increase signal UP (first output) or decrease signal DN (second output) of the phase-frequency detector 203, and outputs an addition signal ADD or subtraction signal SUB to the FSM controller 205. FIG. 4 illustrates an exemplary sense amplifier 204.

The first and second outputs UP and DN of the phase-frequency detector 203 are inputted into the gates of input transistors MN1 and MN2 of the sense amplifier 204, respectively. A positive feedback loop is formed through feedback transistors MN3, MP3, MN4 and MP4, which are cross-coupled to each other. Therefore, when the first output UP of the phase-frequency detector 203 first rises to a high level (i.e., when frequency increases are required), the first output SUB of the sense amplifier 204 rises to a high level. On the contrary, when the second output DN of the phase-frequency detector 203 first rises to a high level (i.e., when frequency decreases are required), the second output ADD of the sense amplifier 204 rises to a high level. The transistors MP1 and MP2 strengthen the positive feedback loop, so that a fast and stable output of the sense amplifier 204 can be achieved.

The FSM controller 205 controls the decoder 206 in accordance with results detected by the phase-frequency detector 203. Alternatively, the FSM controller 205 controls the decoder 206 in accordance with outputs of the sense amplifier 204. Here, the order of operations of the FSM controller 205 is illustrated in FIG. 5.

Figure 5:
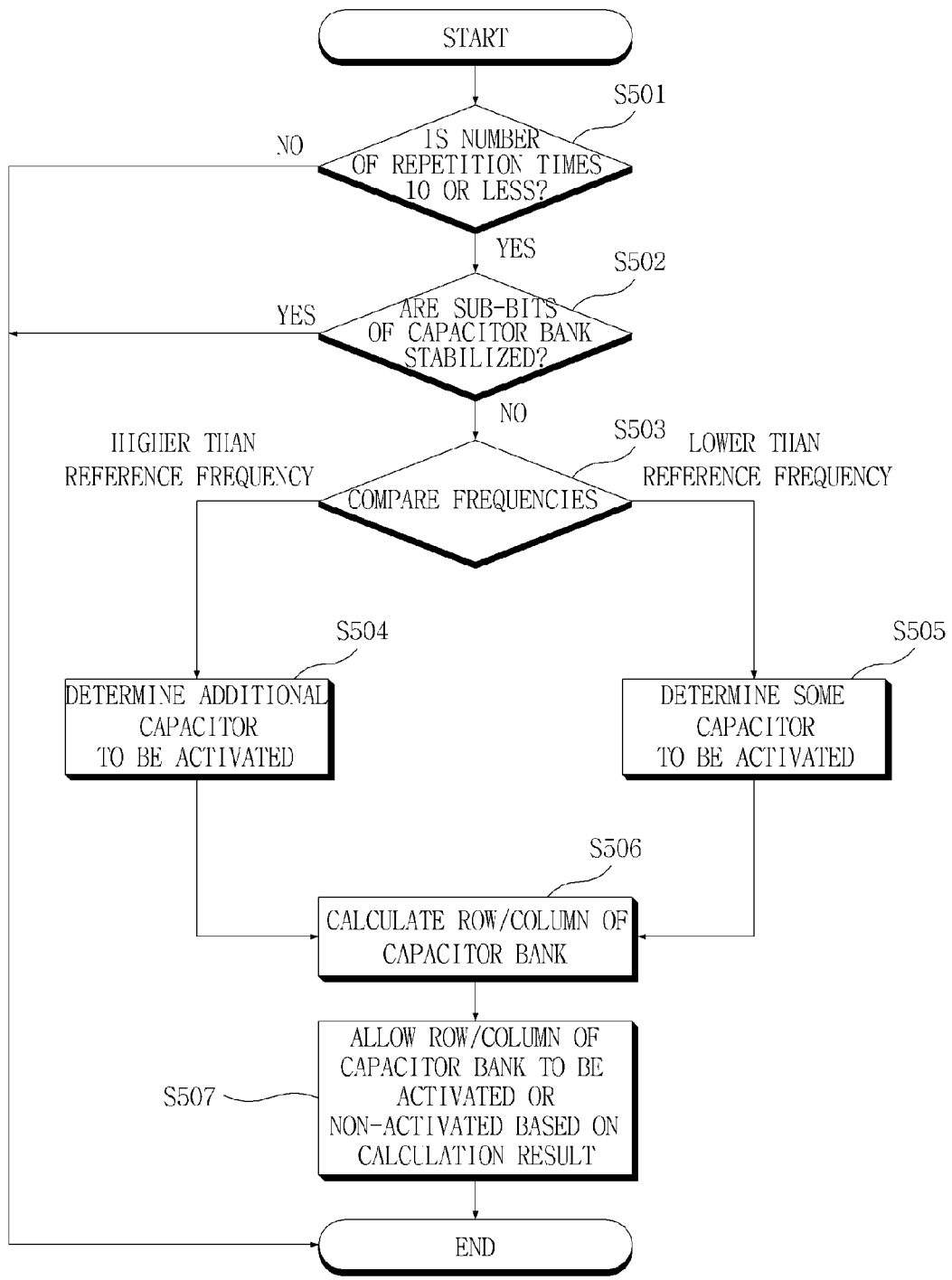
FIG. 5 is a flowchart illustrating an order of operations of an FSM controller according to the embodiment of the present invention.

First, the FSM controller 205 determines whether the number of repetition times of the process shown in FIG. 5 is 10 or less (S501). When the number of repetition times exceeds 10, the process of controlling capacitors is ended. When the number of repetition times is 10 or less, the FSM controller 205 determines whether or not sub-bits of a capacitor row are stabilized (S502). When the sub-bits of the capacitor row are stabilized, the process of controlling capacitors is ended. When the sub-bits of the capacitor row are not stabilized, the FSM controller 205 compares a current resonance frequency with a reference frequency (S503). When the current resonance frequency is higher than the reference frequency, the FSM controller 205 determines that capacitors should be additionally activated (S504). When the current resonance frequency is lower than the reference frequency, the FSM controller 205 determines that some of the activated capacitors should be non-activated (S505). In the step S504, the number of capacitors to be activated is ((NCUR−NPREV)/2). Here, NCUR denotes the number of capacitors that are currently activated, and NPREV denotes the number of capacitors that have been activated in a previous operation (previous one in repetitions of the process of controlling capacitors). In the step S505, the number of capacitors to be non-activated is ((NCUR−NPREV)/2). Here, NCUR denotes the number of capacitors that are currently activated, and NPREV denotes the number of capacitors that have been activated in a previous operation (previous one in repetitions of the process of controlling capacitors).

Subsequently, the FSM controller 205 calculates in which row or column capacitors are activated or non-activated, based on whether capacitors should be activated or non-activated and the number of capacitors to be activated or non-activated as determined in the step S504 or S505 (S506). Then, the FSM controller 205 allows a specific row or column of the capacitor bank 201 to be activated or non-activated, based on the calculation result in the step of S506 (S507).

Through such operations, when the current resonance frequency is higher than the reference frequency, the FSM controller 205 allows capacitors of the capacitor bank 201 to be additionally activated, thereby lowering the current resonance frequency. When the current resonance frequency is lower than the reference frequency, the FSM controller 205 allows capacitors of the capacitor bank 201 to be additionally non-activated, thereby increasing the current resonance frequency. For example, when the total number of capacitors of the capacitor bank 201 is 1024, the FSM controller 205 repeats the process of controlling capacitors, shown in FIG. 5, up to maximum 10 times. The number of capacitors and the number of repetition times of the process of controlling capacitors are exemplary, and the number of capacitors is arbitrary. When the number of capacitors is N, the process of controlling capacitors is repeated up to maximum n times (n denotes the maximum value of integers less than $\log(N)/\log(2)$).

Figure 6:
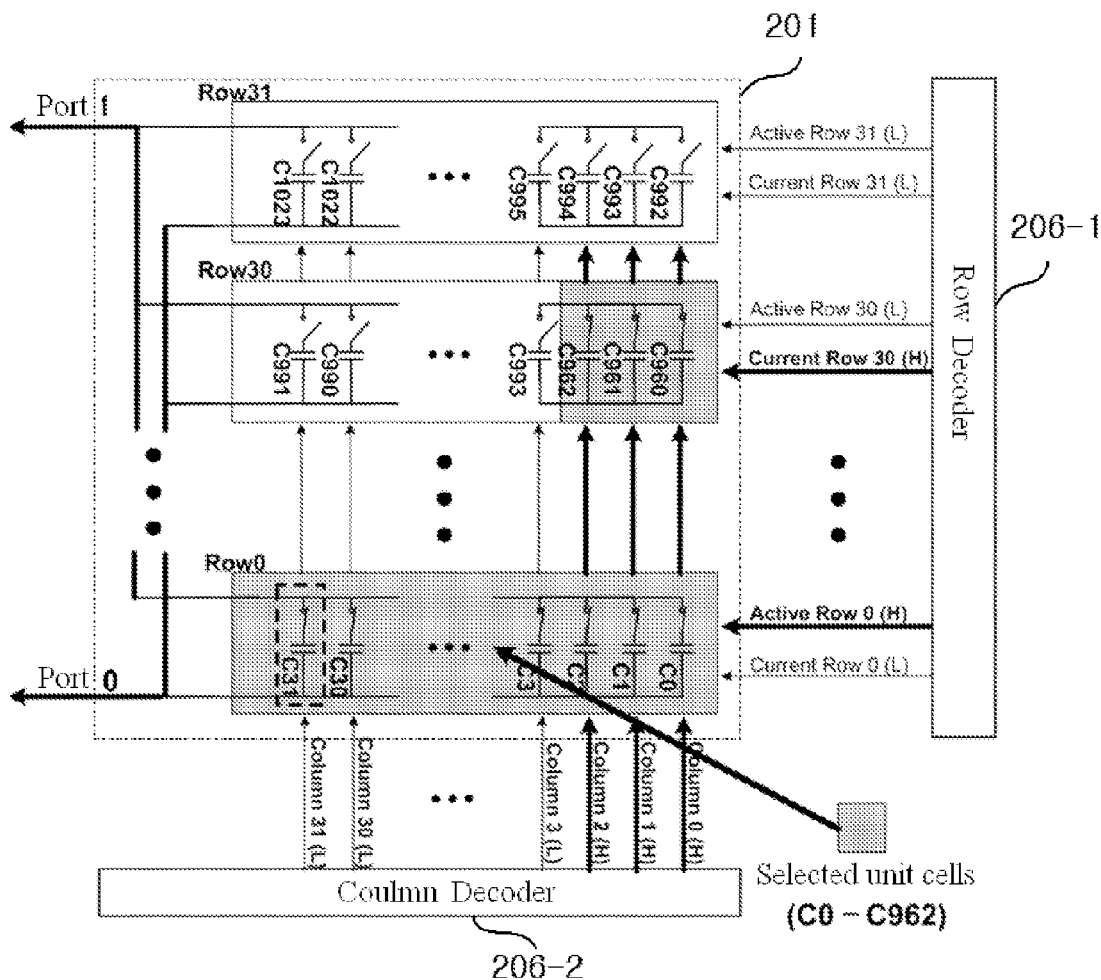
FIG. 6 is a block diagram of a decoder 206 and a capacitor bank 201 according to the embodiment of the present invention.

FIG. 6 is a block diagram of a decoder 206-1, 206-2 and a capacitor bank 201 according to the embodiment of the present invention. An exemplary capacitor bank 202 shown in FIG. 6 comprises capacitors arranged in a 32×32 matrix. That is, the capacitor bank 302 comprises 32 rows and 32 columns. The decoder 206-1, 206-2 comprises a row decoder 206-1 and a column decoder 206-2. The row decoder 206-1 outputs an 'active row signal' and a 'current row signal' to each of the rows of the capacitor bank 201. Each of the 'active row signal' and the 'current row signal' may have a low or high level. The column decoder 206-2 outputs a 'column signal' having a low or high level to each of the columns of the capacitor bank 201.

Figure 7:
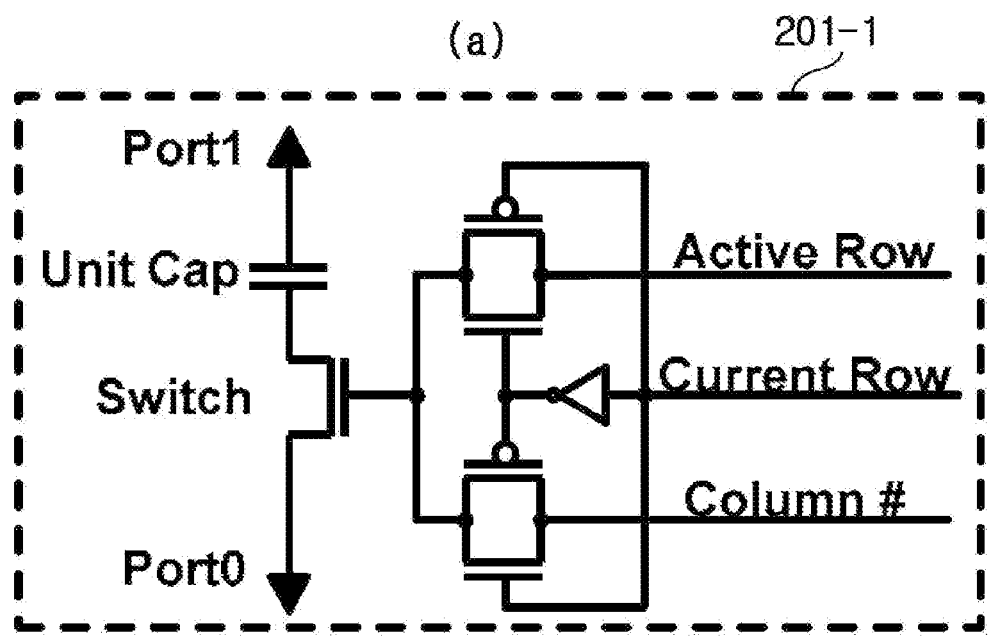
FIG. 7 is a view showing a unit cell 201-1 of the capacitor bank 201 and operations of the capacitor bank 201 in accordance with inputs of the decoder 206.

FIG. 7 is a view showing a unit cell 201-1 of the capacitor bank 201 and operations of the capacitor bank 201 in accordance with inputs of the decoder 206. As shown in FIG. 7(b), when the active row signal and the current row signal, outputted to a specific row (e.g., an X-th row) of the capacitor bank 201, are high and low, respectively, all capacitors of the X-th row are activated regardless of a column signal. When the active row signal and the current row signal, outputted to the specific row (e.g., the X-th row) of the capacitor bank 201, are low and low, respectively, all capacitors of the X-th row are non-activated regardless of column signals. When the current row signal outputted to the specific row (e.g., the X-th row) of the capacitor bank 201 is high and the column signal outputted to a specific column (e.g., a Y-th column) of the capacitor bank 201 is high, a capacitor positioned at the X-th row and the Y-th column is activated regardless of the active row signal outputted to the X-th row.

An exemplary configuration of the unit cell 201-1 of the capacitor bank 201 for performing such operations is shown in FIG. 7(a). The unit cell 201-1 comprises first and second pass transistors, an inverter, a switch and a capacitor. An active row signal of the row decoder 206-1 is inputted to an input terminal of the first pass transistor. A current row signal of the row decoder 206-1 is inputted to an inverting terminal of the first pass transistor, the inverter, and a non-inverting terminal of the second pass transistor. A column signal of the column decoder 206-2 is inputted to an input terminal of the second pass transistor. An output of the inverter is connected to a non-inverting terminal of the first pass transistor and an inverting terminal of the second pass transistor. Outputs of the first and second pass transistors are connected to an input of the switch. When the switch is on, the capacitor is activated.

The operation of the resonance compensator 200 according to the present invention is comprised of two modes. A first mode is a compensation mode in which when current inductance is different from intended inductance, the current inductance is compensated by the difference using the resonance compensator 200. In compensation mode, the resonance compensator 200 compares an output oscillated from the oscillator 202 with an external clock, using the current inductance as an input. The external clock is a reference clock intended by a user, and the resonance compensator 200 measures inductance based on the reference clock.

If the resonance compensator 200 starts operating, a half of the capacitors of the capacitor bank 201 are activated. The phase-frequency detector 203 compares the effective frequency of the oscillator 202 with the reference frequency and then determines whether an oscillation frequency of the oscillator 202 should be heightened or lowered. If it is determined to lower the oscillation frequency, the phase-frequency detector 203, the sense amplifier 204 and the FSM controller 205 allow a half of currently activated capacitors to be additionally activated through the decoder 206. On the contrary, if it is determined to heighten the oscillation frequency, the phase-frequency detector 203, the sense amplifier 204 and the FSM controller 205 allow a half of currently activated capacitors to be non-activated through the decoder 206.

That is, when the oscillation frequency is higher than the reference frequency, capacitance is increased. When the oscillation frequency is lower than the reference frequency, the capacitance is decreased. When the oscillation frequency is identical to the reference frequency, the capacitance is maintained.

When the capacitance is increased, the increased capacitance is 1.5 times greater than that before the capacitance is increased. When the capacitance is decreased, the decreased capacitance is 0.5 times smaller than that before the capacitance is decreased.

As described above, when the capacitor bank 201 is comprised of 1024 unit cells, desired capacitance is adjusted by repeating a binary approximation method maximum 10 times because the tenth power of 2 is 1024. Accordingly, a time taken to compensate for inductance can be saved.

A second mode of the resonance compensator 200 according to the present invention is a transmission/reception mode. The mode in which transmission/reception is performed through the inductive coupling transceiver 220 after the capacitance of the capacitor bank 201 is adjusted through the compensation mode is called a transmission/reception mode. During the transmission/reception mode, the phase-frequency detector 203, the sense amplifier 204, the FSM controller 205, the decoder 206 and the oscillation 202 are powered off. The resonance compensator 200 comprises a power controller 207 to power off the phase-frequency detector 203, the sense amplifier 204, the FSM controller 205, the decoder 206 and the oscillation 202. After the transmission/reception mode is maintained for a certain period of time, the power controller 207 powers on the phase-frequency detector 203, the sense amplifier 204, the FSM controller 205, the decoder 206 and the oscillator 202. Then, the compensation mode starts. As such, power is supplied to only the capacitor bank 201 and the power controller 207 of the resonance compensator 200 during the transmission/reception mode. Accordingly, power consumption of the resonance compensator 200 can be saved.

The power controller 207 may power off all of the phase-frequency detector 203, the sense amplifier 204, the FSM controller 205, the decoder and the oscillator 202. Alternatively, the power controller 207 may power off any one the phase-frequency detector 203, the sense amplifier 204, the FSM controller 205, the decoder and the oscillator 202, or a combination thereof.

The power controller 207 comprises switches respectively powering on/off the phase-frequency detector 203, the sense amplifier 204, the FSM controller 205, the decoder and the oscillator 202; a timer measuring a time when the compensation mode and the transmission/reception mode are maintained; and a controller turning on/off the respective switches based on the measured time of the timer.

Figure 8:
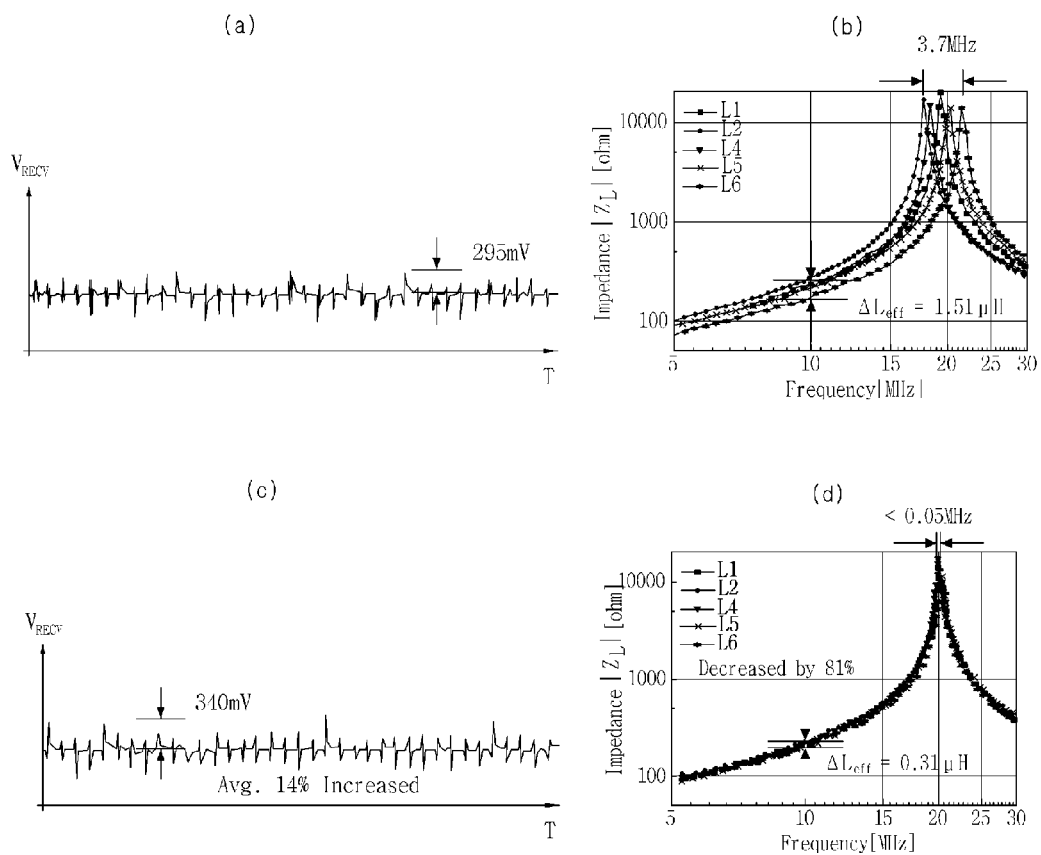
FIG. 8 is a view showing results of an inductive coupling transceiver 220 operated when the resonance compensator 200 according to the embodiment of the present invention is employed and when it is not employed.

FIG. 8 is a view showing results of an inductive coupling transceiver 220 operated after the resonance compensator 200 is employed (b) and before the resonance compensator 200 is not employed (a) according to the embodiment of the present invention. By employing the resonance compensator 200, impedance variation of inductance at a reception side, generated when the resonance compensator 200 is not employed, can be decreased by 81%. Accordingly, the variation of signal intensity (voltage) at a reception side in pulse-based inductive coupling communications is reduced. Therefore, it can be seen that, in FIG. 8, the signal intensity at a reception side is increased by 14%, and variation between different inductances hardly exists.

Although an MP3 transmitting device formed in clothes having a layer structure is used as an embodiment of the present invention, a resonance compensator according to the present invention may be used in any inductive coupling transceiver. For example, the resonance compensator according to the present invention may be used in a mobile phone with a built-in inductive coupling device and a hands-free system for automobiles.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, the scope of the present invention should be understood within the scope of the present invention defined by the appended claims.

What is claimed is:

1. A flexible inductive coupling transmitting and receiving apparatus, comprising:
   an inductive coupling transceiver transmitting and/or receiving data;
   a flexible inductor connected to the inductive coupling transceiver; and
   a resonance compensator connected to the inductive coupling transceiver and the inductor to compensate for a change in inductance of the inductor as i) a distance between said flexible inductor and another inductor changes, ii) a relative position of said flexible inductor changes with respect to another inductor, or iii) said flexible inductor flexes or bends.

2. The inductive coupling transmitting and receiving apparatus of claim 1, wherein the resonance compensator comprises:
   a capacitor bank comprising a plurality of unit capacitors, each of the capacitors are able to be activated or non-activated independently;
   a decoder allowing the unit capacitors of the capacitor bank to be activated or non-activated;
   an oscillator oscillating at a certain frequency based on capacitance of the capacitor bank and inductance of the flexible inductor;
   a phase-frequency detector comparing the frequency oscillated from the oscillator with a predetermined frequency; and
   a finite state machine (FSM) controller controlling the decoder based on results detected by the phase-frequency detector.

3. The inductive coupling transmitting and receiving apparatus of claim 2, wherein the resonance compensator further comprises a power controller controlling any one of the phase-frequency detector, the sense amplifier, the FSM controller, the decoder and the oscillator, or a combination thereof.

4. A flexible inductive coupling transmitting and receiving apparatus according to claim 1, said apparatus further comprising a first flexible layer and a second flexible layer, said inductive coupling transceiver further comprising:
   a transmitter formed on said first flexible layer; and
   a receiver formed on said second flexible layer.

5. A flexible inductive coupling transmitting and receiving apparatus according to claim 4, said flexible inductor comprising:
   a first flexible inductor formed on said first flexible layer and connected to said transmitter; and
   a second flexible inductor formed on said second flexible layer and connected to said receiver and inductively coupled to said first flexible inductor.

6. A flexible inductive coupling transmitting and receiving apparatus according to claim 5, said resonance compensator being connected to at least one of said first and second flexible inductors.

7. A flexible inductive coupling transmitting and receiving apparatus according to claim 5, said resonance compensator further comprising:
   a first resonance compensator connected to said first flexible inductor; and
   a second resonance compensator connected to said second flexible inductor.

8. A flexible inductive coupling transmitting and receiving apparatus according to claim 4, wherein at least one of said first and second flexible layers comprises fabric and said apparatus is integral with a garment.

9. A flexible inductive coupling transmitting and receiving apparatus according to claim 5, wherein a mutual inductance between said first and second flexible inductors varies as i) a distance between said inductors changes, ii) a relative position of one of said inductors to the other changes, or iii) at least one of said inductors flexes or bends.

10. A resonance compensator in a flexible inductive coupling transmitting and receiving apparatus having a flexible inductor, comprising:
    a capacitor bank comprising a plurality of unit capacitors, each of the capacitors being activated or non-activated;
    a decoder allowing the unit capacitors of the capacitor bank to be activated or non-activated;
    an oscillator oscillating at a certain frequency based on capacitance of the capacitor bank and variable inductance of the flexible inductor;
    a phase-frequency detector comparing the frequency oscillated from the oscillator with a predetermined frequency; and
    an FSM controller controlling the decoder based on results detected by the phase-frequency detector,
    wherein said resonance compensator compensates for a change in inductance of the flexible inductor as i) a distance between said flexible inductor and another inductor changes, ii) a relative position of said flexible inductor changes with respect to another inductor, or iii) said flexible inductor flexes or bends.

11. The resonance compensator of claim 10, further comprising a power controller controlling any one of the phase-frequency detector, the sense amplifier, the FSM controller, the decoder and the oscillator, or a combination thereof.

12. A method for compensating for changes in inductance in an inductive coupling transmitting and receiving apparatus comprising a variable capacitor, a flexible inductor having an inductance that changes as i) a distance between the flexible inductor and another inductor changes, ii) a relative position of the flexible inductor changes with respect to another inductor, or the flexible inductor flexes or bends, and a transceiver, comprising:
    comparing an oscillation frequency of an oscillator connected to the variable capacitor and the flexible inductor with a predetermined reference frequency; and
    changing capacitance of the variable capacitance based on the frequency comparison result.

13. The method of claim 12, wherein, in the changing of the capacitance, the capacitance is increased when the oscillation frequency is higher than the reference frequency; the capacitance is decreased when the oscillation frequency is lower than the reference frequency; and the capacitance is maintained when the oscillation frequency is identical to the reference frequency.

14. The method of claim 13, wherein when the capacitance is increased, the increased capacitance is 1.5 times greater than that before the capacitance is increased, and when the capacitance is decreased, the decreased capacitance is 0.5 times smaller than that before the capacitance is decreased.

* * * * *